June 8, 1943.  G. V. JOHNSON  2,321,029
INDUSTRIAL LIFT TRUCK
Filed Sept. 2, 1941  2 Sheets-Sheet 1
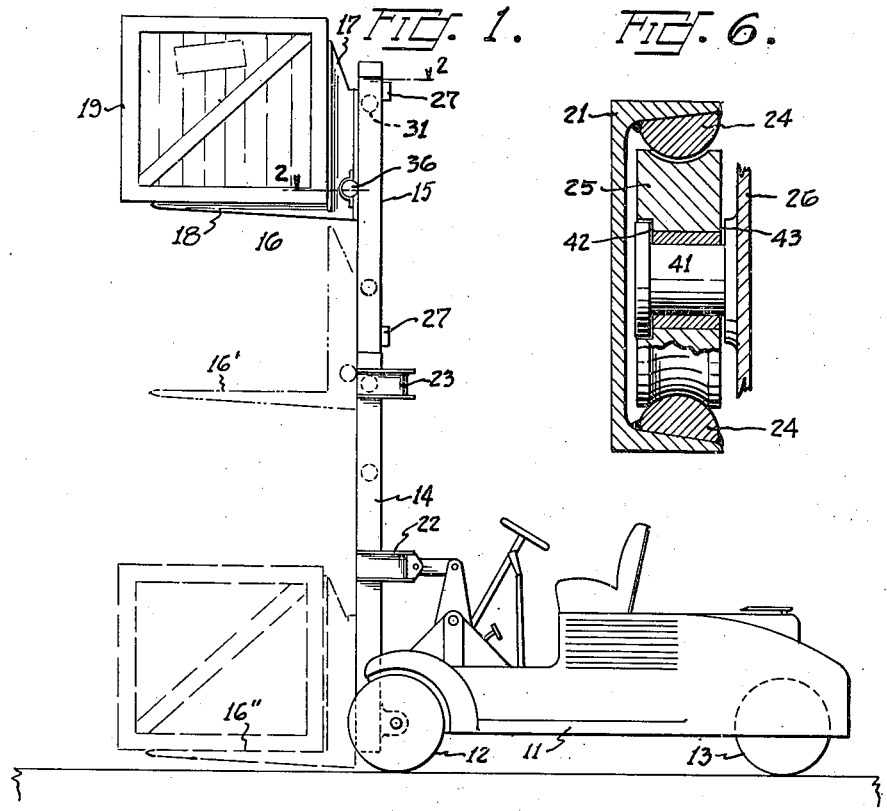
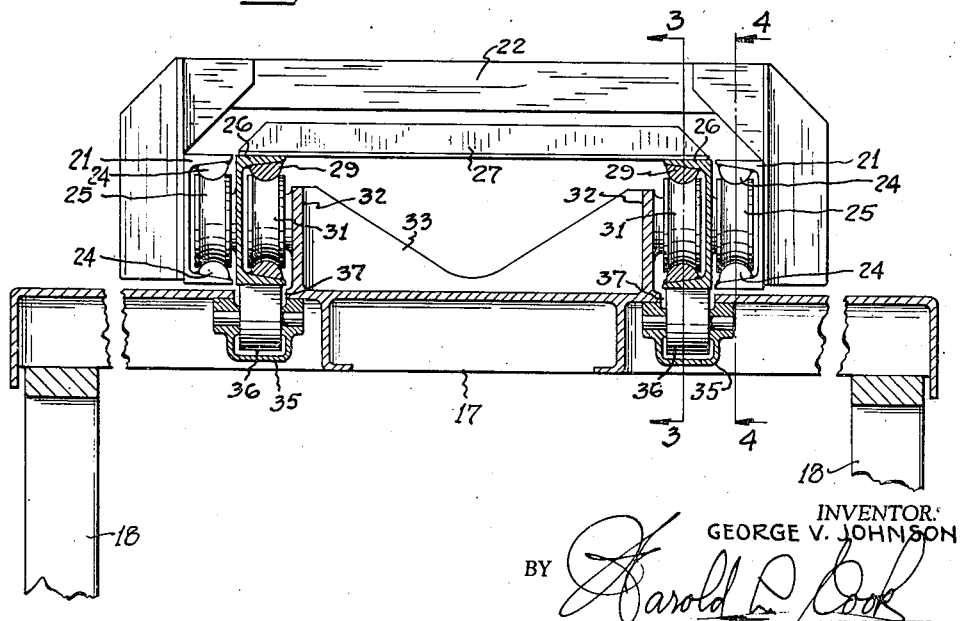
INVENTOR.
GEORGE V. JOHNSON
BY Harold D. Cook
ATTORNEY.

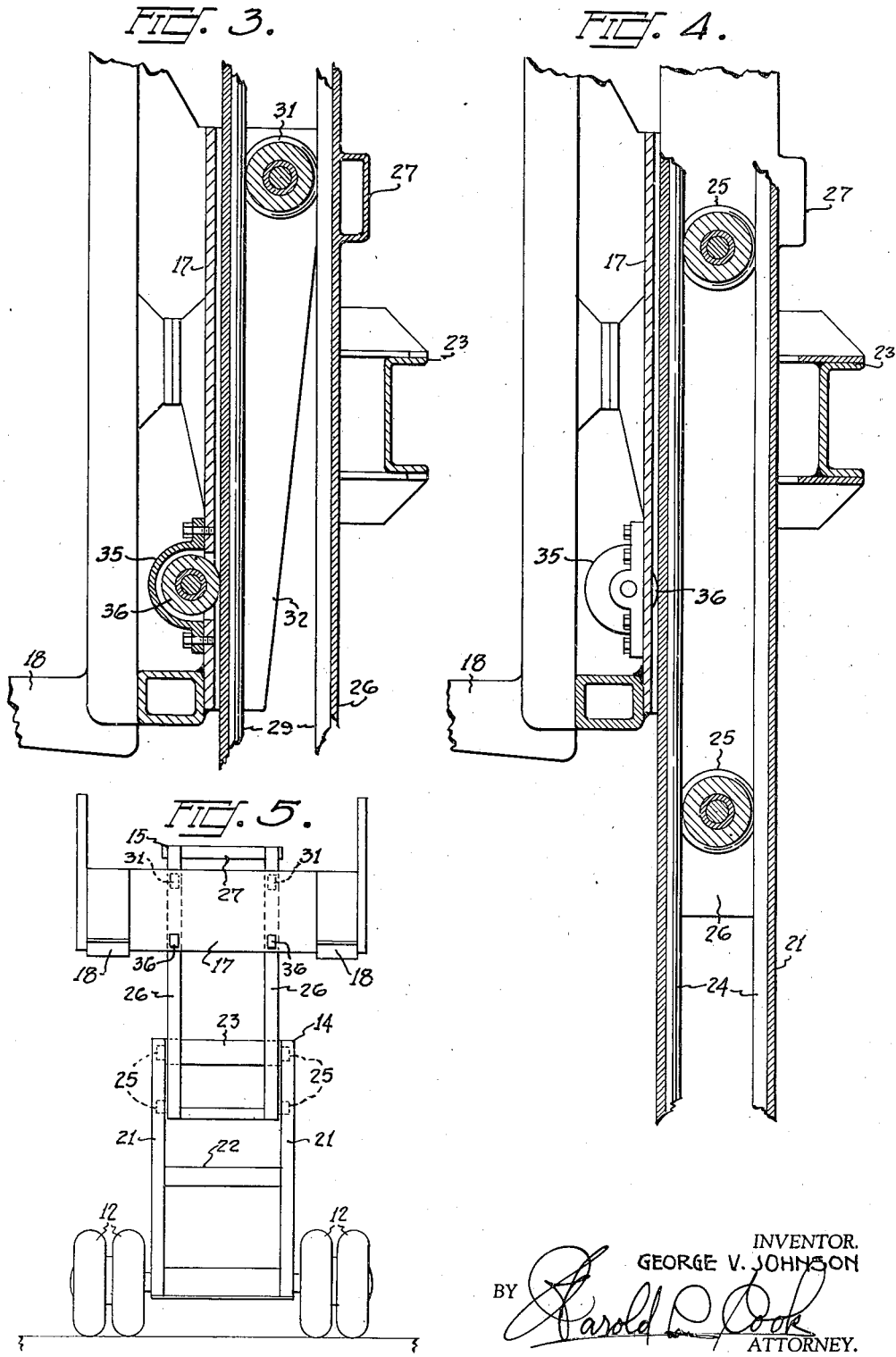

Patented June 8, 1943

2,321,029

UNITED STATES PATENT OFFICE 2,321,029

INDUSTRIAL LIFT TRUCK

George V. Johnson, Portland, Oreg., assignor to Willamette Hyster Company, Portland, Oreg., a corporation of Oregon Application September 2, 1941, Serial No. 409,173

6 Claims. (Cl. 187—9)

This invention relates to industrial trucks, and more particularly to industrial trucks having a lifting platform for elevating loads to a predetermined height. The general object of the invention is to provide an industrial lift truck of high lift capacity which will be efficient in operation, strong and rugged in construction, and capable of being economically manufactured.

The usual industrial lift truck comprises a vehicle provided with a load handling means consisting of an upright structure and a load lifting platform which is arranged for vertical longitudinal movement thereupon. In a single lift truck, the upright structure is formed by a single frame secured to the vehicle, while in a double lift truck the structure is formed by the addition of a secondary upright which is telescopically movable relative to the first, or primary upright. Movement between the relatively movable parts of the structure is guided by means of cooperating rollers and guideways provided therefor. The rollers are generally of the flat rim type which ride within channel guideways having opposed parallel flat surfaces. These channels must be specially constructed for the reason that the inner surfaces of the flanges of standard structural channels do not face each other in a parallel relation, but are inclined at a slight angle with respect to the channel web. These sloping flange faces do not provide suitable runner guides for rollers having flat surfaces, and, if the surfaces of the rollers are tapered at an angle corresponding to the angle of the flange surfaces, so as to engage squarely with the flange faces, then under heavy load conditions there is an inherent tendency for the rollers to cause the channels to spread apart and permit the rollers to escape from the guideway. Suitable channels with parallel opposed guiding surfaces may be machined from solid stock, but it will readily be understood that such procedure would be prohibitively costly. In preference to the latter procedure, it is the usual practice to weld inserts against the inner surface of standard channel flanges, the inserts being of a generally rectangular configuration, except that one face thereof is first machined with a taper corresponding with the taper of the channel flange and which face is then welded against the channel flange. The inserts are welded into the channels by a pair of continuous welds along diagonally opposite corners, the inner corner of the insert being welded rigidly to the channel web and the outer corner to the outer edge of the flange. As is well known by those skilled in the art, such a welding procedure performed on a channel shape causes considerable distortion thereof so that it must subsequently be straightened. Following the straightening operation, the facing surfaces of the guideway inserts are machined in order that the spacing therebetween will be uniform, and to provide smooth bearing surfaces for the rollers. This mode of manufacture also is relatively expensive, and a roller and guideway arrangement which lends itself to more economical construction is greatly to be desired.

In use of the lift truck effort is made to pick up loads by the platform so that the weight is reasonably centered thereupon. Usually, however, the load distribution upon the platform is not exactly uniform, and, depending upon the degree of unbalance, the load platform and the supporting uprights are subjected to a considerable sidewise thrust or twist. In a truck provided with a conventional roller and guideway arrangement, an unbalanced condition of a heavy load will cause diagonally spaced rollers to shift crosswise of the guideways and bind against the channel webs and thus interfere with the normal lifting operation. This tendency is particularly true of the telescopic uprights which, when in the extended position, provide long lever arms for any lateral forces. It is further desirable, therefore, to provide such a roller and guideway arrangement which will insure free and easy movement of the load lifting structure of the truck.

It is a further object of the invention, therefore, to provide an industrial lift truck having a new and improved roller and guideway arrangement between relatively movable uprights and between one of the uprights and the load carrying platform, which arrangement embodies standard structural shapes and which are so assembled as to obviate the necessity of further machining operations.

Another object of the invention is to provide a new and improved arrangement of guideways and rollers between telescopically movable uprights and between one of such uprights and a load lifting platform of an industrial lift truck, which arrangement is efficient in operation and is inherently capable of smooth performance under heavy loads, even though the load on the platform may be considerably unbalanced.

In one form the invention comprises an industrial lift truck having a primary upright comprising a pair of facing channels rigidly secured in a parallel spaced relation, and a secondary upright also comprising a pair of facing channels rigidly secured in a parallel spaced relation, the secondary upright being arranged for telescopic movement between the primary upright channels. A load lifting platform is mounted for longitudinal movement upon the secondary upright. The longitudinal movement between the primary and secondary uprights, and between the load lifting platform and the secondary upright, is guided by means of rollers rotatably secured to one of the relatively movable parts and cooperating guideways formed in the other of the relatively movable parts. The guideways are formed by means of half round structural bars welded to the inner surfaces of the flanges of the channel members of the primary and secondary uprights. The outer surface of the rollers is grooved with a curvature similar to the curvature of the half round bars, the diameter of the rollers at the bottom of the groove being just slightly less than the spacing between the half round bars welded within the channel members, so that the rollers arranged in the guideways are retained in position but are freely movable longitudinally of the uprights.

For a more complete understanding of the invention, reference may be had to the following description, and to the drawings, in which:

Figure 1 is a side elevation of an industrial lift truck having a load handling structure according to the present invention.

Figure 2 is a sectional view of the uprights and load lifting platform, taken along the line 2—2 of Figure 1.

Figures 3 and 4 are sectional views of the structure, taken along the line 3—3 and 4—4, respectively, of Figure 2.

Figure 5 is a diagrammatic front elevation of the industrial lift truck of Figure 1, showing particularly the arrangement of uprights and load carrying platform in the elevated position.

Figure 6 is an enlarged sectional view through one of the channels, illustrating the roller and guideway arrangement in greater detail.

Referring now to the drawings, the industrial lift truck comprises a main frame 11, supported by front wheels 12 and rear wheels 13. A load handling structure is shown comprising a primary upright 14, suitably mounted upon the front end of the truck, and a secondary upright 15 which is longitudinally movable in a telescopic manner relative to the primary upright 14. A platform, indicated generally at 16, comprising an apron 17 and arms 18 for lifting loads, such as a package indicated at 19, is mounted for longitudinal movement on the secondary upright 15. The uprights and load carrying platform are shown in the extended position in full line, the platform being further indicated in the intermediate and lowermost positions in dotted lines at 16' and 16", respectively.

The primary upright 14 comprises a pair of similar channels 21 which are rigidly fixed in a parallel spaced relation by means of transverse braces 22 and 23 with the open sides of the channels facing each other. To the inner faces of the channel flanges are welded longitudinal half round structural bars 24 forming guideways for cooperatively receiving rollers 25 rotatably secured to the secondary upright 15.

The secondary upright 15 comprises a pair of channels 26 rigidly secured in a parallel spaced relation by means of a plurality of transverse braces 27, with the open sides of the channels facing each other. The spacing of the channels 26 is such that the outer width of the secondary upright is somewhat less than the distance between the channels of the primary upright. A pair of rollers 25 are suitably secured at spaced points to the outer surface of the webs of each of the channels 26 which, when arranged within the guideways of the primary upright, permit longitudinal telescopic movement of the secondary uprights relative to the primary upright. Welded to the inner surface of the flanges of the secondary upright channels 26 are longitudinal half round bars 29, forming guideways for cooperatively round bars 29, forming guideways for cooperatively receiving grooved rollers 31 which are rotatably secured to the load lifting platform for facilitating longitudinal movement therebetween.

Extending rearwardly from the apron 17 of the load lifting platform 16 at substantially right angles with respect thereto are a pair of spaced members 32 which are suitably braced by one or more transversely extending webs 33, the distance between the oppositely facing sides of the members 32 being somewhat less than the distance between the channels 26 of the secondary upright 15. Rollers 31 are rotatably mounted on the outer sides of the members 32 adjacent the upper end thereof. Suitably secured to the apron 17 adjacent the lower end thereof in the housings 35 are rollers 36, the rims of which extend through cooperative openings 37 in the apron, permitting engagement with the outer surface of the forward flange of the secondary upright channels 26. It will readily be understood that the weight of the forwardly extending platform will exert a torque upon the upright structure in a counterclockwise direction, as viewed in Figure 1, tending to cause the upper rollers 31 to be held in engagement with the forward runner of the guideway and to force the lower rollers 36 into engagement with the outer surface of the forward channel flanges.

In order that the specification might be limited to the description of the invention itself, such details as relate to the drive mechanism by which the lifting operation is performed have been omitted, it being understood that such mechanisms are well known in the art in various forms such as hydraulic rams, chain or cable arrangements adapted to be energized from the truck motor.

In the manufacture of the roller guideways the half round bars are first clamped in any suitable manner tightly against the inner surface of the channel flanges. The base dimension of the half round bars is preferably somewhat less than the width of the flat portion of the inner flange surface so that the half round bar will lie smoothly thereagainst as shown in Figure 6. The inner and outer edges of the half round bar are then welded at spaced intervals to the channel flange, it being unnecessary, for reasons which will be explained more fully hereinafter, to extend the welds throughout the length of the channels. By welding only to the extent reasonably necessary, the channel flanges will not be heated to such a degree that the channel members will be appreciably distorted from their original straight condition. Furthermore, since the heating due to welding will be concentrated on the relatively heavy flange sections, warping tendencies will be greatly decreased as compared with those following the usual practice of continuously welding the guideway inserts along one edge to the web of the channel shape. After the welding operation has been completed the clamps may be removed, and the spacing of the guideway runners will be substantially uniform so that no machining operations will be necessary to condition the runner surfaces for the rollers.

It will be apparent that upon application of loads to the truck platform the forces will be transmitted therefrom to the vehicle frame through the rollers and runners without tending to spread the spaced upright channel members from their normal parallel relation. Under excessive loads, the channel flanges might tend to deflect slightly outwardly, but any such deflections will not alter the direction of the applied forces to cause spreading of the channels. For example, referring to Figure 6, assume that the load is directed against the lower runner 24 tending to deflect the lower channel flange outwardly. The lower runner will be rotated slightly in a clockwise direction about its longitudinal axis, but due to the complimentary rounded surfaces of the runner and roller, the center of the bearing surface of the runner will merely be shifted slightly to the left without otherwise affecting the general distribution of the load. Since the runners are welded solely to the flanges, such outward deflections of the flanges under load do not impress any additional forces on the welds such as occur with conventional arrangements in which the inner edge of the flat runner insert is welded to the web of the channel. Therefore, the half round runners do not require heavy continuous welds to hold them in place, and spaced tack welds are sufficient, which do not heat the channels so as to cause excessive warping thereof.

In the welding of the runners to the channel flanges reasonable care is taken to space the runners parallel with the flange edge. However, to insure that the grooved rollers will fit squarely over the crown of the runners, the rollers are mounted for limited axial movement upon their respective bearings 41 as indicated by the clearances 42 and 43 on opposite sides of the roller. In the raising and lowering of loads, due to the action of the lift drive, the rollers may engage at intervals with either of the opposite runners of the guideways. Since the opposed runners may not be exactly aligned, the rollers may shift axially upon their bearings slightly to compensate for any irregularities in the runner alignments.

In the loaded condition of the truck platform the rollers are normally held firmly in engagement with the runners substantially throughout the width of the roller grooves. Inherently each roller will thus be held with its axis at right angles to the runners, and any tendency for the axis of the roller to be deflected from such a position, such as by an unbalanced load condition, will be resisted. Due to the fact that the diameter of the roller flanges is greater than the spacing between runners of each guideway, the rollers cannot be laterally displaced therefrom and moved into engagement with the web of the channel even under extremely unbalanced conditions of loading. Accordingly, smooth operation of the load lifting mechanism is insured throughout normal usage of the truck.

Having described the principles of my invention in what is considered a preferred embodiment, I desire to have it understood that the specific details of arrangement are merely illustrative, and that the invention may be carried out in other ways. In the appended claims, therefore, it is intended to cover all such modifications and variations as fall within the true scope and spirit of the invention.

I claim:

1. In an industrial truck, a main frame, a primary upright secured to said frame and comprising a pair of inwardly facing channel members rigidly fixed relative to each other in a spaced parallel relation, a secondary upright comprising a pair of inwardly facing channel members rigidly fixed relative to each other in a spaced parallel relation, said secondary upright being arranged for telescopic movement within said primary upright, a pair of rollers rotatably mounted in a spaced relation upon the outer sides of each of the channel members of said secondary upright, said rollers extending between flanges of corresponding channel members of said primary upright, a pair of half round metal bars welded to the inner surfaces of the flanges of each of the channels of said primary upright, the periphery of said rollers being provided with a concave groove for cooperatively fitting over said bars, the diameter of the flanges of said rollers being greater than the spacing between said pair of bars.

2. In a truck, an upright comprising a pair of inwardly facing channel members rigidly fixed with respect to each other in a parallel spaced relation, load lifting means including an apron, a pair of horizontally spaced rollers rotatably mounted on said apron and extending into corresponding of said channel members with the axes of said rollers at right angles with respect to the plane of the webs of said channel members, runners having bearing surfaces semicircular in cross section welded to the facing surfaces of the channel flanges longitudinally of said members, said rollers having a grooved outer surface for cooperatively fitting over said runners, the opposed flanges of said rollers having diameters greater than the spacing between said runners.

3. In an industrial truck having an upright and a load lifting platform arranged for longitudinal movement on said upright, a pair of spaced parallel guideways on said upright, each of said guideways comprising a pair of spaced parallel half round roller runners rigidly secured to said upright with the rounded surfaces of the runners facing each other, rollers rotatably secured to said platform for movement about parallel axes, said parallel axes extending at right angles between said guideways, said rollers having grooved rims, the curvature of the groove being such as to fit cooperatively over the crown of said runners, said rollers being arranged in corresponding upright guideways, the crowns of the opposed runners, of each air extending between the roller flanges.

4. In an industrial truck having an upright and a load lifting platform arranged for longitudinal movement on said upright, a pair of spaced parallel guideways on said upright, each comprising a pair of spaced parallel roller runners having a semicircular bearing surface, said runners being rigidly secured to said upright with the rounded surfaces of the runners facing each other, rollers rotatably secured to said platform, said rollers having grooved rims for cooperatively fitting over the crown of either runner of the corresponding guideway, the flanges of the rollers having a diameter greater than the spacing between the runners of the corresponding guideway, bearings for supporting said rollers on said platform, said rollers being arranged on said bearings for restricted axial movement whereby full engagement of said roller grooves over the runner crowns is assured.

5. In an industrial lift truck, an upright secured to said truck and comprising a pair of inwardly facing parallel channel members, a load carrying platform arranged for longitudinal movement relative to said upright, a roller rotatably mounted on each of the opposing sides of said platform and extending between the flanges of said channel members with the axes of said rollers being substantially at right angles with respect to the webs of said channel members, a half round metal bar welded longitudinally to each of the facing surfaces of the flanges of said channel members forming guideways for said rollers, the surfaces of said rollers being provided with a concave groove for cooperatively fitting over said bars, the flanges of said rollers having a diameter greater than the minimum spacing between the bars of said guideways.

6. In a truck, an elongated upright comprising a pair of channel members fixed relative to each other in a spaced relation with the webs thereof being parallel, a load carrying platform mounted on said upright for longitudinal movement with respect thereto, said platform having a roller rotatably mounted on each of the opposite sides thereof and extending between the flanges of corresponding of said channel members, the axes of said rollers extending at right angles to the webs of said channel members, a half round bar welded longitudinally to each of the facing surfaces of said channel members forming guideways for said rollers, said rollers having a concave groove in the periphery thereof for cooperatively engaging said guideways, the diameter of said rollers at the bottom of said groove being slightly less than the minimum spacing between said guideways whereby said rollers are maintained within said channel members.

GEORGE V. JOHNSON.